Nov. 22, 1960
K. M. CRAIG
2,961,126
LIVESTOCK FEEDER
Filed Sept. 5, 1958
4 Sheets-Sheet 2
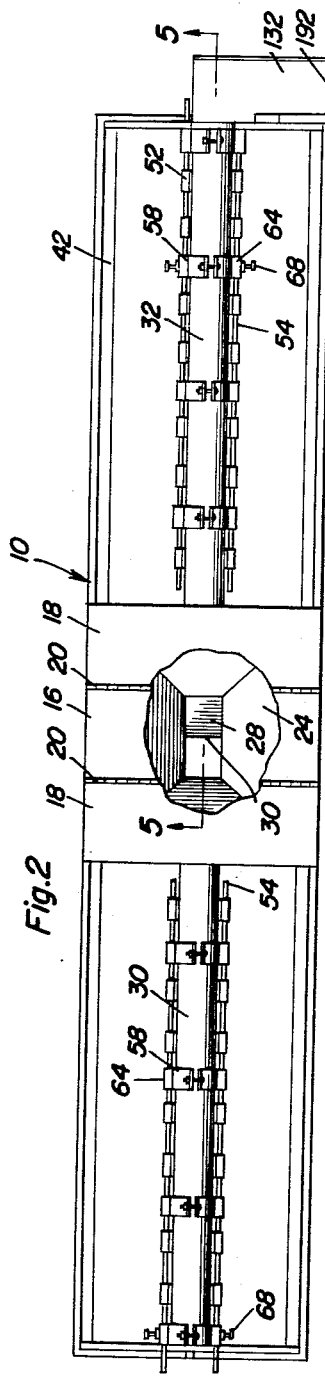
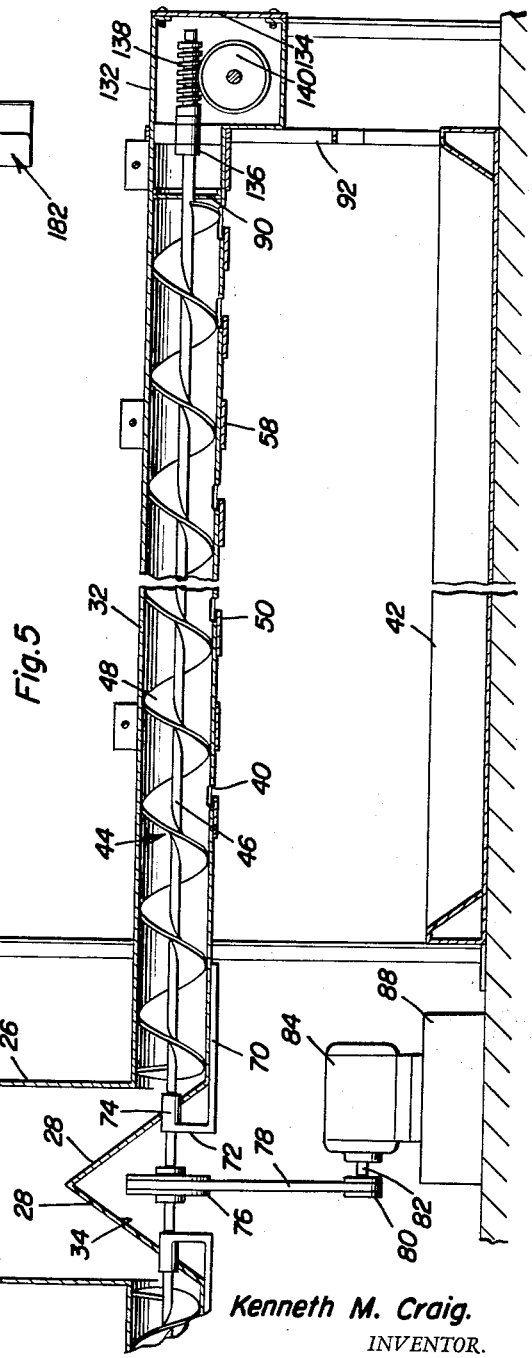
Kenneth M. Craig.
INVENTOR.

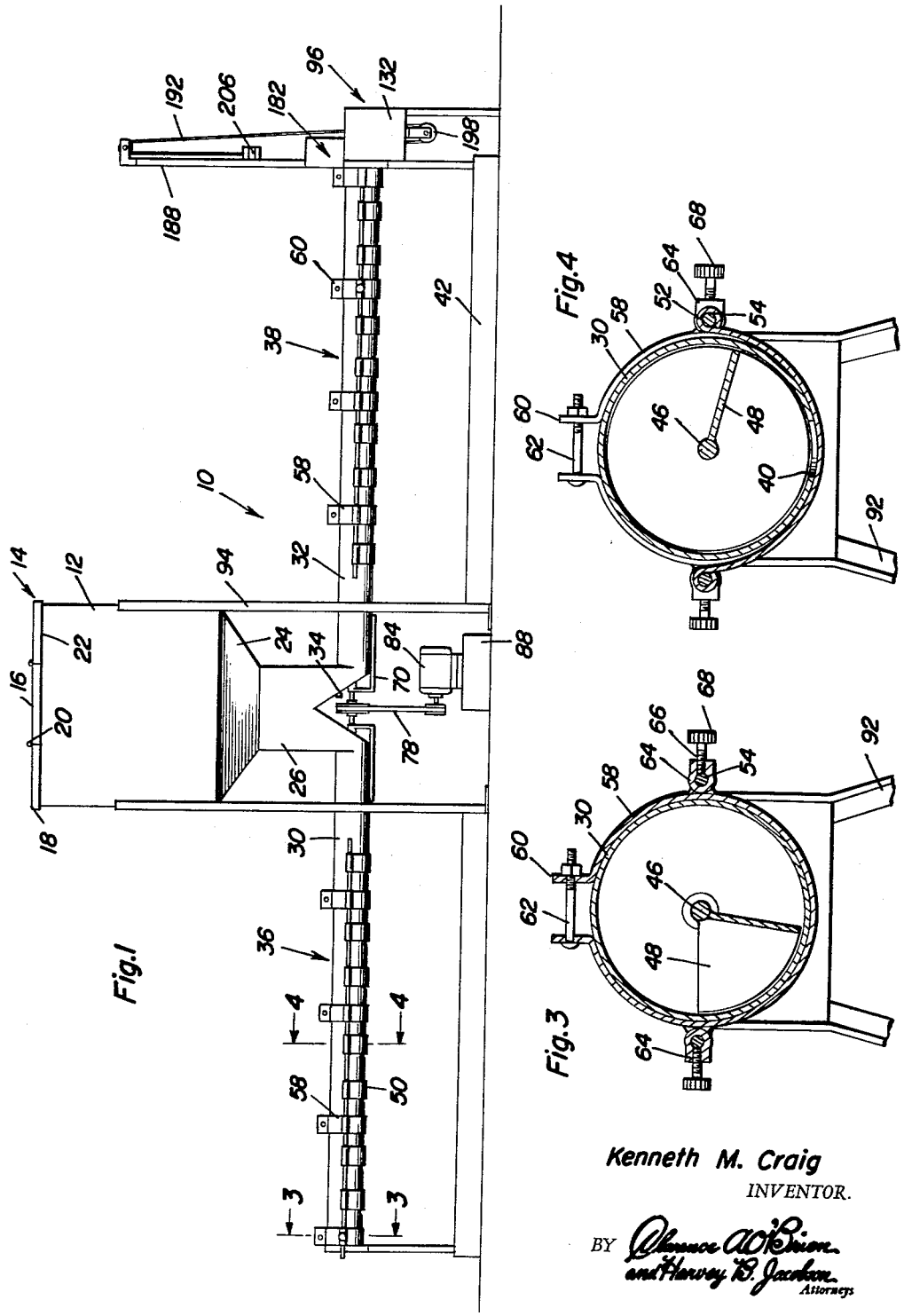

Kenneth M. Craig
INVENTOR.

Nov. 22, 1960 K. M. CRAIG 2,961,126
LIVESTOCK FEEDER
Filed Sept. 5, 1958 4 Sheets-Sheet 4

Kenneth M. Craig
INVENTOR.

United States Patent Office 2,961,126
Patented Nov. 22, 1960

2,961,126

LIVESTOCK FEEDER

Kenneth M. Craig, Box 352, Enterprise, Oreg.

Filed Sept. 5, 1958, Ser. No. 759,178

5 Claims. (Cl. 222—14)

The present invention generally relates to a feeding device especially for livestock that consume that type of ration normally termed a dry feed and includes novel structural arrangement for automatically operating the feeder at predetermined time intervals during the day together with a novel mechanism for limiting the quantity fed at each feeding period.

The primary object of the present invention is to provide a livestock feeder which is substantially automatic in operation thus reducing the time and labor required for feeding livestock such as cattle, hogs, as well as chickens and other similar animals.

In carrying out the objects of this invention, there is provided an enlarged feed bin together with a lateral conveyor or conveyors for metering the dry feed at a plurality of points into an elongated trough or bunker with the device being operated by a timer arrangement or operated manually if desired with the quantity of feed discharged at any one feeding being variable so that the desired amount will be discharged by varying the number of revolutions of a positive displacement screw auger conveyor for each feeding cycle or period.

A further important object of the present invention is to provide a livestock feeder in the form of a screw auger conveyor having a supply bin connected therewith and discharge openings in the conveyor housing with sliding closure plates thereof for varying the size of the opening with the structure including further devices for controlling the number of revolutions of the screw auger during each operation cycle.

Another important object of the present invention is to provide a livestock feeder in accordance with the immediately preceding object in which the screw auger conveyor drives a winch mechanism having a weighted line connected thereto together with a clutch mechanism for the winch drive so that the winch drive will be disconnected each time the screw auger is stopped with the weighted line then returning the winch to a normal condition with the clutch means then being rendered effective again for subsequent operation of the control mechanism in the next feeding cycle with the clutch mechanism also operating a switch allowing the time mechanism to initiate operation of the conveyor when the next feeding cycle begins.

Yet another object of the present invention is to provide a livestock feeder which is simple in construction, versatile in utility, accurate in limiting the quantity of feed discharged, simple in construction, relatively trouble-free, dependable, long lasting and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the livestock feeder of the present invention;

Figure 2 is a top plan view of the livestock feeder with portions of the top of the bin broken away showing the divider therein;

Figure 3 is a vertical transverse, sectional view taken substantially upon a plane passing along section line 3—3 of Figure 1 illustrating the construction of the support clamps and sleeves for the elongated rods forming a part of the control mechanism for the plurality of apertures in the conveyor;

Figure 4 is a transverse, vertical sectional view taken substantially upon a plane passing along section line 4—4 of Figure 1 illustrating the construction of one of the pipe opening covers and the manner in which it is mounted on the rods;

Figure 5 is a longitudinal, vertical sectional view taken substantially upon a plane passing along section line 5—5 of Figure 2 illustrating the construction of the conveyor and the drive means therefor together with the drive means at the free end for the measuring or control device;

Figure 6:
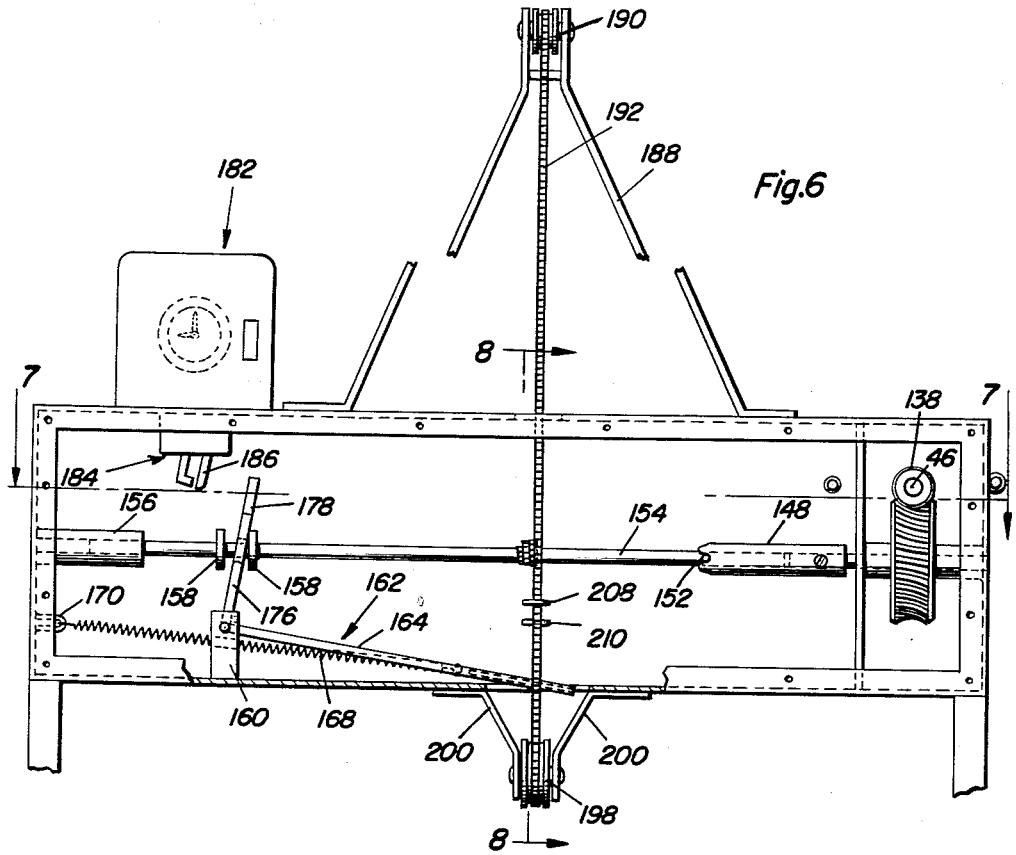
Figure 6 is an elevational view of the control mechanism with the outer plate thereof removed for illustrating the structure.

Referring now specifically to the drawings, the numeral 10 generally designates the livestock feeder of the present invention which includes an enlarged vertically disposed hopper or bin 12 in the form of a generally rectangular container having an open top which is provided with a lid generally designated by the numeral 14 and including a central section 16 and a pair of side or end sections 18 hingedly connected thereto by hinge members 20. The lid or top 14 is provided with a depending flange 22 for telescopic engagement with the top of the bin 12 thus forming an effective weather seal for the bin 12 but yet permitting the material to be disposed therein. The lower end of the bin 12 is provided with inwardly sloping walls 24 and downwardly extending from the lower ends of the inwardly sloping walls 24 is a vertical discharge chute or spout 26 of rectangular hollow configuration having vertically disposed side and end walls and having a pair of upwardly inclined and converging bottom walls 28 which terminate in a transverse ridge line 30 as clearly shown in Figure 2 for the purpose of dividing the chute 26 into two separate areas each having a downwardly sloping wall. The end walls of the chute 26 merge into and receive an enlongated tubular housing which extends from opposite ends of the chute 26 in a horizontal direction and are designated by the numerals 30 and 32 respectively. As shown in Figure 1, the side walls of the chute 26 match the edges of the inclined bottom wall 28 thus providing an inverted V-shaped recess 34 in the bottom of the chute 26 for a purpose described hereinafter.

The tubular housings 30 and 32 form part of conveyor assemblies generally designated by the numeral 36 and 38 which are substantially identical and thus a single conveyor assembly 38 will be described. With reference to Figure 5, the conveyor assembly 38 includes the elongated cylindrical tubular housing 32 which communicates with the chute 26 as clearly illustrated. The bottom of the housing 32 is provided with a series of longitudinally spaced openings or apertures 40 therein which will discharge material downwardly into an elongated open top through 42 which may be of any suitable construction and of sufficient depth to hold the quantity of feed that will be fed to the animals. Disposed within the elongated tubular housing 32 is an elongated screw auger generally designated by the numeral 44 which includes an elongated shaft 46 and the usual spiral flight 48 thereon which is closely received within the tubular housing 32 so that the screw auger 44 will act substantially as a positive displacement conveying apparatus.

Each of the discharge openings 40 is provided with a generally U-shaped cover or valve 50 having a loop or sleeve 52 formed on each end thereof for rigid mounting on an elongated rod 54. The rod 54 is disposed on both sides of the housing 32 and the relationship between the covers 50 and the apertures 40 will determine the quantity of material discharged.

For slidably supporting the rods 54, split pipe clamps 58 are provided which have spaced flanges 60 defining the split in the clamp with a bolt 62 serving to collapse the clamp 58 in longitudinally adjusted position on the elongated tubular housing 32. Rigidly mounted on opposite sides of each of the pipe clamps 58 is a tubular sleeve 64 slidably receiving the respective rods 54. A setscrew 66 having a knurled head 68 is threaded into the sleeve 64 for clamping engagement with the rod 64 thus adjusting the longitudinal position of the rod 54 in the sleeve 64. It is pointed out that the size of the openings 40 increase progressively from the inner end or bin engaging end of the tubular housing 32 towards the outer end thereof or in lieu of this, the arrangement of the pipe covers 50 is initially adjusted so that the effective size of the discharge opening is larger at the outer end of the tubular housing 32 as clearly shown in Figure 5. This orientation enables the feed to be distributed evenly to the very end of the conveyor so that an equal amount will be discharged at each discharge opening 40. By loosening the setscrew 66 and sliding all of the covers simultaneously since they are rigid with the rods 54, the setting of all of the apertures is changed.

It is noted that the inner end of the tubular housing 32 is provided with a longitudinally extending support bracket 70 on the lower surface thereof which terminates at its inner end in an upturned member 72 having a cylindrical bushing or bearing 74 thereon forming a support for the inner end of the shaft 46. The shaft 46 in one conveyor assembly 38 is a continuation of the shaft assembly in the other conveyor assembly 36 and have a single pulley 76 mounted thereon which receives a V-belt 78 that also encircles a drive pulley 80 on the output shaft 82 of a suitable electric motor 84 mounted upon a base or any other suitable support 88 thus driving the shaft 46 in one direction. Thus, the flight 48 on the conveyor assembly 38 is reverse in relation to the flight on the screw auger of the conveyor assembly 36 so that the feed will be moved outwardly from the bin.

The tubular housing 32 is provided with a closure plate 90 which forms a closure for the outer end of the tubular housing and prevents the passage of feed beyond the inner end of the tubular housing. There is provided a support frame 92 for the outer end of the tubular housing 32 with the outer plate clamp 58 being disposed immediately inwardly of the support frame 92. There is also provided supporting legs or any other suitable supporting structure with the legs being designated by the numeral 94 for supporting the bin 12 and these legs 94 also position and retain the trough 42 with the other end of the trough 42 being a support for the framework 92. Except for the reverse leads on the flight 48, the conveyor assemblies 36 and 38 as described up to this point are of the same construction and will effectively provide a metering or measuring arrangement for the discharge of the material inasmuch as the close fitting relationship between the screw auger 44 and the tubular housing 42 will form a positive displacement screw auger conveyor assembly with the rotational speed of the screw auger 44 determining the rate of discharge of the screw auger 44.

With the foregoing description, it will be seen that the feed discharged will be the same under each discharge opening regardless of its distance from the bin and the setting may be varied by moving the rods 54. A manual control may be provided for the motor 84 or a timer control may be provided therefor for turning the motor on at a predetermined time or times each day for feeding thus eliminating the necessity of an attendant during the feeding operation. Inasmuch as it is also desirable to control the quantity of feed discharge during each feeding operation, a control arrangement or measuring arrangement generally designated by the numeral 96 is provided at the outer end of the conveyor assembly 38 and is not provided at the end of the conveyor assembly 36.

Figure 9:
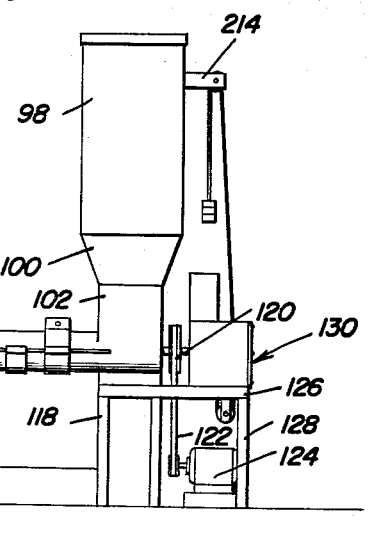
Figure 9 is a side elevational view of a modified form of the present invention in which only a single lateral conveyor assembly is employed.

The disclosure in Figure 9 is somewhat similar to that previously set forth but includes a conveyor assembly for moving the material from the bin in one direction. The bin is designated by the numeral 98 with the sloping sides 100 leading into a chute 102 which has an elongated cylindrical housing 104 connected and communicated therewith with the housing 104 having the pipe clamps 106 thereon the discharge aperture covers 108 supported on the rods 110 which are slidable in the sleeves 112 on the pipe clamps 106. The outer end of the tubular housing 104 is supported by a framework 114 and a trough 116 is received under the tubular housing 104 and a supporting framework 118 is provided for the bin 98 and the shaft of the conveyor assembly is provided with a drive pulley 120 having a V-belt 122 encircling the same for receiving power from a motor 124. In this construction, the framework 118 is provided with brackets 126 and supporting legs 128 for supporting a control mechanism generally designated by the numeral 130 which is the same as the control mechanism 96 and which is employed for controlling the operation of the drive motor in response to the number of rotations of the shaft of the conveyor assembly or assemblies. Thus, the control mechanisms 130 and 96 are substantially similar and only one control assembly will be specifically described. It is pointed out that the function and operation of the conveyor assembly in Figure 9 is substantially the same as the conveyor assembly 36 or the conveyor assembly 38 in Figure 5 with there being a different arrangement of drive mechanism and control apparatus.

As previously stated, the purpose of the control or measuring device 96 is to stop the conveyor assemblies after they have been started by a timer device so that the conveyor assemblies will operate only for a predetermined length of time for each cycle of operation. In other words, each time the conveyors are started by the timer device, the measuring device 96 will stop the conveyors after they have been running for a preset time.

Figure 7:
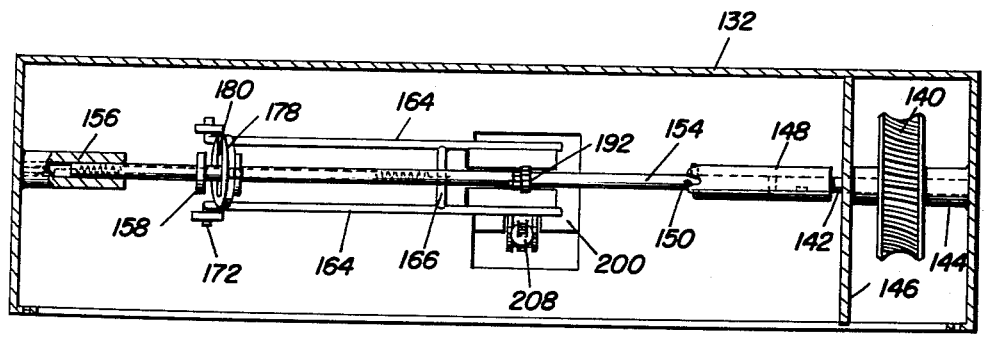
Figure 7 is a plan sectional view taken substantially upon a plane passing along section line 7—7 of Figure 6 illustrating further structural details of the control mechanism.

The measuring or control device 96 includes a generally transversely elongated hollow housing of parallelopiped construction 132 which is supported from the supporting framework or legs and includes a removable inspection plate or outer plate 134 forming the outer side wall of the device. The shaft 46 extends through the partition 90 and is journaled in a support bearing 136 supported from the framework 92 with the terminal end of the shaft 46 being provided with a worm gear 138 which is in meshing engagement with a worm drive gear 140 supported on shaft 142 journaled in bearings 144 carried by an end wall and a partition wall 146 whereby the shaft 142 is rotated at a reduced speed by rotation of the shaft 46. The shaft 142 is provided with a cylindrical sleeve 148 on its inner end having a series of notches 150 on the outer end thereof with the notches 150 extending axially and generally forming gear notches for receiving a transverse pin 152 mounted on a winch shaft 154 which is slidable and rotatable in a sleeve bearing 156 on the opposite end wall and within the tubular sleeve 148 itself as clearly shown in Figures 6 and 7. The winch shaft 154 is provided with a pair of spaced collars 158 rigidly mounted thereon in spaced relation with the collars 158 being disposed adjacent to the bearing 156. An upstanding pair of brackets 160 support a clutch operating lever generally designated by the numeral 162 which includes a pair of elongated members 164 disposed in spaced parallel relation which are rigidly interconnected by a transverse bar 166 to which a tension coil spring 168 is attached. The other end of the tension coil spring 168 is attached to a loop 170 on the end wall of the housing 132. The terminal ends of the elongated members 164 extend outwardly as indicated by the numeral 172 and are pivotally journaled in the upper ends of the brackets 160. Thus, the free end of the members 164 may swing in an arc about the center defined by the outturned ends 172. The arrangement of the spring 168 is such that the line of force of the spring will pass over the center of rotation formed by the outturned ends 172 thus urging the free ends of the members 164 either in a downward direction or in an upward direction depending upon which side of the center of rotation the spring 168 is disposed. This construction is commonly referred to as an overcenter spring for urging the clutch operating lever in either of its two positions. Rigidly mounted on the member 164 is an upstanding rod 176 having a laterally opening member 178 thereon which engages over the winch shaft 154 and is received between the collars 158. The member 178 may be in the form of a circular member having a slot 180 therein which extends to one edge of the member so that the device may be assembled onto the winch shaft 154 and the members 164 sprung inwardly sufficiently for engagement of the terminal ends 172 with the brackets 160. Thus, the members 164, 176 and 178 are all rigid with each other and form generally a bell crank construction having the overcenter spring 168 attached thereto. Therefore, when the free ends of the members 164 are in their down position as shown in Figure 6, the pin 152 is in engagement with the notches 150. When the free ends of the members 164 are lifted upwardly, the shaft 154 will be moved longitudinally to the left as viewed in Figure 6 for disengagement of the pin 152 from the notches 150 thus separating the drive sleeve 148 from the winch shaft 154. The spring 168 will maintain either of the two mentioned positions until the device has been moved so that the spring passes over the center of pivotal movement of the clutch lever 162.

As previously stated, a timer generally designated by the numeral 182 may be provided and may be a conventional time-clock which will actuate the drive motor at predetermined set times during the day. Generally, two feeding periods occur, and it is only necessary for the timer 182 to actuate the livestock feeder motor twice a day. Disposed below the timer 182 which is mounted on the top of the housing 132 is a switch assembly generally designated by the numeral 184 having a movable contact member 186 disposed in the path of movement of the upper end of the member 178 which forms a part of the clutch lever 162. When the member 178 engages the movable contact 186, the switch mechanism 184 will be actuated to deenergize or break the circuit to the drive motor thus stopping the drive motor for the conveyor augers. Inasmuch as the conveyor augers are of positive displacement, cessation of rotation thereof will immediately stop discharge of the feed thereby providing an accurate control for the quantity of feed discharged.

Figure 8:
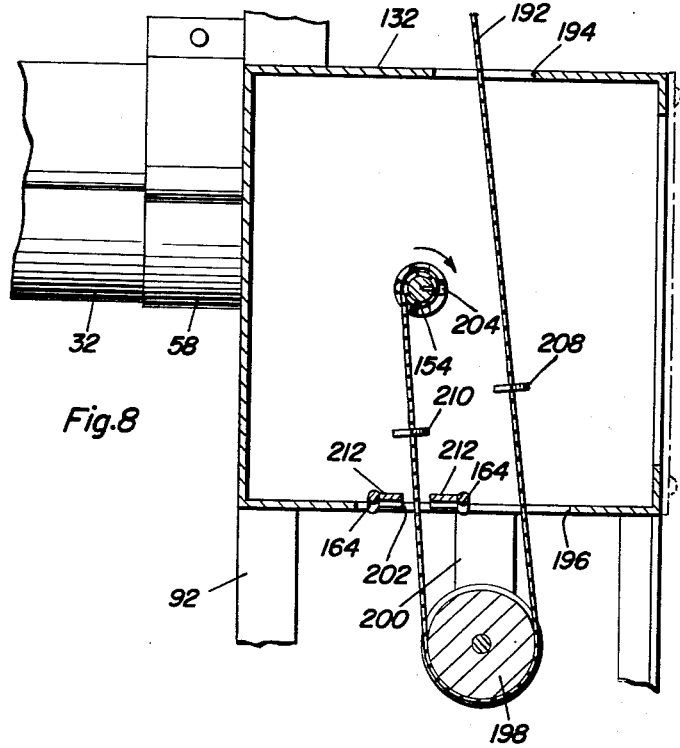
Figure 8 is a vertical sectional view taken substantially upon a plane passing along section line 8—8 of Figure 6 illustrating further structural details of the control mechanism.

As to the mechanism for operating the clutch lever 162 there is provided an upstanding support member 188 having a pulley 190 thereon receiving a flexible member such as a chain 192. The chain 192 extends through an opening 194 in the top of the housing 132 and then downwardly through an opening 196 in the bottom of the housing 132 and then over a pulley or sprocket gear 198 supported from a pair of brackets 200 below the housing 132. The flexible chain then passes upwardly through an opening 202 in the bottom of the housing 132 and is attached to the winch shaft 154 by a suitable fastening bolt or the like 204. The free end of the flexible chain 192 which passes over the pulley 190 is provided with a weight 206 which retains the flexible chain 192 in taut condition and will return the chain 192 to a normal position since the shaft 154 is free to rotate when the pin 152 is disengaged from the notches 150. Mounted on the flexible chain 192 is a pair of adjustably mounted stop members 208 and 210. Where the chain 192 goes through the opening 202, the elongated members 164 are disposed and are each provided with an inwardly extending plate 212 having a distance therebetween less than the diameter or smallest dimensions of the stop members 208 and 210 thereby assuring that the members 208 and 210 will not pass through the slot formed by the two plates 212 which are mounted on the elongated members 164. Thus, with the device in the condition as illustrated in Figure 8 and with the timer 182 causing the motor to start, the shaft 154 will be rotated thus winding the flexible chain 192 on the shaft 154. When the stop member 208 passes around the pulley 198 and engages the plates 212, the plates 212 will be moved upwardly thus swinging the members 164 about the pivot axis formed by the outturned ends 172 whereupon the spring 168 will pass over the center of pivotal movement of the clutch lever 162 and cause longitudinal shifting movement of the shaft 154 due to engagement of the member 178 with the collars or flanges 158 thereby moving the shaft 154 longitudinally. As soon as this occurs, the weight 206 will cause counterrotation of the shaft 154 and unwinding of the flexible chain 192 therefrom. As the flexible chain 192 is being unwound, the stop member 210 on the flexible chain 192 will be engaged with the plates 212 which are still in their upper position due to the spring 168 thus moving the plates 212 downwardly and causing the members 164 to swing downwardly so that the spring 168 will move over center thus urging the members 154 back to their normal position as shown in Figure 6. Meanwhile, when the clutch lever 162 was raised by the stop member 208, the top of the member 178 has engaged the movable contact or switch arm 186 thus interrupting the circuit for the electric motor and deenergizing the relay that is provided normally for keeping the motor running thereby stopping the motor so that upon movement of the member 178 back to its normal position, the switch unit 184 will return to its normal position thus enabling the timer to again energize the motor when the time interval has passed and it is time for another feeding cycle.

The flexibility of the chain 192 permits the longitudinal movement of the shaft 154 with no adverse effects since the movement of the shaft 154 is of relatively small magnitude inasmuch as the ends of the shaft 154 are slidably and rotatably received in the sleeve 148 and the sleeve bearing 156.

In Figure 9, the control apparatus operates in the same manner with the exception that the upper pulley 190 is supported from brackets 214 mounted directly on the side of the bin 98.

In view of the positive displacement of the screw auger, each rotation thereof measures out a specific quantity of feed. Thus, by controlling the number of revolutions by employing the present construction the amount of feed dispensed in each feeding operation may be easily controlled inasmuch as every rotation of the auger shaft will in turn wind up a particular amount of chain on the winch shaft. The stops or stop dogs are adjustable on the chain and the weight 206 causes the chain to unwind from the winch shaft thus resetting the mechanism automatically for another feeding operation.

The foregoing is considered as illustrative only of the principles of the invention. Further, since numerous modifications and changes will readily occur to those skilled in the art, it is not desired to limit the invention

What is claimed as new is as follows:

1. A livestock feeder comprising an elevated supply bin having a downwardly extending chute, an inverted V-shaped bottom in said chute for dividing the chute into separate sections, an elongated cylindrical housing extending horizontally from each section of the chute and communicated therewith for receiving material therefrom, an elongated screw auger in each of said housings for moving material laterally therein, said housing having a closed outer end for preventing discharge of material from the end, said housing having a plurality of longitudinally spaced discharge openings in the bottom surface thereof, a trough underlying the openings for receiving material thereon, a plurality of cover members for selectively closing the openings, a pair of elongated rods interconnecting said cover members, sleeve members mounted on said housing for slidably supporting said rods for adjusting the position of the cover members for varying the effective discharge size of the openings with the openings being progressively larger toward the outer end of the housing for providing an equal discharge of material through the openings regardless of the distance from the bin, means connected with the screw augers for rotatably driving the same, and bearing means at each end of each tubular housing rotatably supporting the screw auger, one of said screw augers being provided with a power take-off shaft, and means responsive to the number of revolutions of the screw augers for stopping the rotation of the screw augers thereby limiting the amount of material conveyed by the screw augers, said last-named means including a winch shaft, clutch means selectively connecting the winch shaft to the power take-off on the screw auger, a flexible line connected with the winch shaft, means on the line for selectively clutching the winch shaft to the power take-off and declutching the same, and a weight connected to the line for unwinding the line from the winch shaft when the winch shaft is declutched from the power take-off, said means for rotatably driving said screw augers including an electric circuit vital thereto, means for closing said circuit to initiate rotation of said augers, switch means for breaking said circuit to halt rotation of said augers, switch operating means connected to said winch shaft and operably associated with said switch means to actuate the latter to circuit opening position in response to a predetermined number of revolutions of said augers subsequent to closing of said circuit by said circuit closing means.

2. The combination of claim 1 wherein said winch shaft is slidably and rotatably mounted, said power take-off having a sleeve rotatably and slidably journaling one end of said winch shaft with the sleeve having notches in the ends thereof, and transverse pins on the winch shaft for engagement with the notches for forming said clutch means, a generally L-shaped bell crank member supported for pivotal movement about the apex thereof, the short leg of said L-shaped member being disposed between a pair of collars on the winch shaft for movement of the winch shaft longitudinally upon pivotal movement of the L-shaped member, the other leg of the L-shaped member having formed therein a slot receiving a flexible line, said means on said line comprising a pair of longitudinally spaced stop members on said line for moving the L-shaped member in response to linear movement of the line thereby moving the L-shaped member to separate the pin from the notches thus letting the winch shaft idle in relation to the power take-off.

3. The combination of claim 2 wherein said L-shaped member is provided with a tension spring of the over-center type for urging the free end thereof which bridges the flexible line to both the clutching position and the declutching position.

4. A control device for a positive displacement conveyor having a rotatable screw auger shaft comprising a power take-off from the shaft, a winch shaft, clutch means connecting the winch shaft and the power take-off, means for rotating said auger shaft including an electric circuit vital thereto, means for closing said circuit to initiate rotation of said auger shaft, switch means for breaking said circuit to halt rotation of said auger shaft, switch operating means connected to said switch shaft and associated with said switch means and actuating the latter to circuit opening position in response to a predermined number of revolutions of said auger shaft subsequent to closing of said circuit by said circuit closing means, a flexible member connected with the winch shaft for winding and unwinding thereon, a weight supported by the free end of the flexible member, a clutch member for moving the winch shaft longitudinally for clutching and declutching, and means on said line for operating the clutching member for a predetermined number of revolutions of the screw auger with the weight returning the flexible line and winch shaft back to a normal position for another operation.

5. A livestock feeder comprising an elevated supply bin having a downwardly extending chute, an inverted V-shaped bottom in said chute for dividing the chute into separate sections, an elongated cylindrical housing extending horizontally from each section of the chute and communicated therewith for receiving material therefrom, an elongated screw auger in each of said housings for moving material laterally therein, said housing having a closed outer end for preventing discharge of material from the end, said housing having a plurality of longitudinally spaced discharge openings in the bottom surface thereof, means connected with the screw augers for rotatably driving the same, bearing means at each end of each tubular housing rotatably supporting the screw auger, one of said screw augers being provided with a power take-off shaft, and means responsive to the number of revolutions of the screw augers for stopping the rotation of the screw augers thereby limiting the amount of material conveyed by the screw augers, wherein said last-named means includes a winch shaft, clutch means selectively connecting the winch shaft to the power take-off on the screw auger, a flexible line connected with the winch shaft, means on the line for selectively clutching the winch shaft to the power take-off and de-clutching the same, and a weight connected to the line for unwinding the line from the winch shaft when the winch shaft is de-clutched from the power take-off, said means for rotatably driving said screw augers including an electric circuit vital thereto, means for closing said circuit to initiate rotation of said augers, switch means for breaking said circuit to halt rotation of said augers, switch operating means connected to said winch shaft and operably associated with said switch means to actuate the latter to circuit opening position in response to a predetermined number of revolutions of said augers subsequent to closing of said circuit by said circuit closing means.

References Cited in the file of this patent

UNITED STATES PATENTS

| | | |
|---|---|---|
| 2,128,252 | Johnson | Aug. 30, 1938 |
| 2,369,755 | Rosselot | Feb. 20, 1945 |
| 2,793,615 | Kerkvliet | May 28, 1957 |